US011533089B2

(12) United States Patent
Farhadi et al.

(10) Patent No.: US 11,533,089 B2
(45) Date of Patent: Dec. 20, 2022

(54) PRE-CODING SETTING

(71) Applicant: Telefonaktiebolaget LM Ericsson (publ), Stockholm (SE)

(72) Inventors: Hamed Farhadi, Stockholm (SE); Ulf Gustavsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/416,426

(22) PCT Filed: Dec. 20, 2018

(86) PCT No.: PCT/EP2018/086398
§ 371 (c)(1),
(2) Date: Jun. 18, 2021

(87) PCT Pub. No.: WO2020/126016
PCT Pub. Date: Jun. 25, 2020

(65) Prior Publication Data
US 2022/0077900 A1    Mar. 10, 2022

(51) Int. Cl.
*H04L 5/12*      (2006.01)
*H04B 7/0456*    (2017.01)
*H04B 7/06*      (2006.01)

(52) U.S. Cl.
CPC ......... *H04B 7/0456* (2013.01); *H04B 7/0632* (2013.01)

(58) Field of Classification Search
CPC ................ H04B 7/0456; H04B 7/0632
(Continued)

(56) References Cited

U.S. PATENT DOCUMENTS 7,747,250 B2    6/2010  Larsson et al.
2003/0185285 A1 10/2003 Talwar
(Continued)

FOREIGN PATENT DOCUMENTS

| JP | 2006507710 A   | 3/2006  |
|----|----------------|---------|
| WO | 20190242852 A1 | 12/2019 |
| WO | 20200104014 A1 | 5/2020  |

OTHER PUBLICATIONS

Ulf Gustavsson et al.( "On the Impact of Hardware Impairments on Massive MIMO", Globecom 2014 Workshop—Massive MIMO: From Theory to Practice, Feb. 2014, pp. 294-300).*

(Continued)

*Primary Examiner* — Helene E Tayong
(74) *Attorney, Agent, or Firm* — Rothwell, Figg, Ernst & Manbeck, P.C.

(57)    ABSTRACT

Pre-coding methods are disclosed for a transmitter node and for a receiver node, respectively. The transmitter node and/or the receiver node comprises at least one hardware component causing signal distortion for a forward channel and/or a reverse channel Transmitter node reference signals are transmitted by the transmitter node and received by the receiver node, wherein the transmitter node reference signals result from use of a transmitter node transmission pre-coding setting and an allocated transmission power. The receiver node estimates a forward channel disturbance component (including the signal distortion for the forward channel), selects a receiver node reception pre-coding setting based on the estimated forward channel disturbance component, and updates a receiver node transmission pre-coding setting by using the selected receiver node reception pre-coding setting as receiver node transmission pre-coding setting. Receiver node reference signals are transmitted by the receiver node and received by the transmitter node, wherein the receiver node reference signals result from use (Continued)

of the updated receiver node transmission pre-coding setting. The transmitter node estimates a reverse channel disturbance component (including the signal distortion for the reverse channel), selects a transmitter node reception pre-coding setting based on the estimated reverse channel disturbance component, and updates the transmitter node transmission pre-coding setting by using the selected transmitter node reception pre-coding setting as transmitter node transmission pre-coding setting. Corresponding pre-coding apparatuses, transmitter/receiver nodes, and computer program product are also disclosed.

20 Claims, 2 Drawing Sheets

(58) Field of Classification Search
USPC .......................................................... 375/262
See application file for complete search history.

(56) References Cited

U.S. PATENT DOCUMENTS

| 2015/0030334 | A1* | 1/2015 | Eiselt | H04J 14/0282 |
| | | | | 398/79 |
| 2018/0241456 | A1* | 8/2018 | Nilsson | H04B 7/0619 |
| 2019/0097728 | A1* | 3/2019 | Frankel | H04B 10/505 |

OTHER PUBLICATIONS

International Search Report and the Written Opinion of the International Searching Authority, issued in corresponding International Application No. PCT/EP2018/086398, dated Jul. 15, 2019, 11 pages.

Farhadi et al. "Distributed Transceiver Design and Power Control for Wireless MIMO Interference Networks", IEEE Transactions On Wireless Communications, Mar. 1, 2015 (Mar. 1, 2015), vol. 14, No. 3, pp. 1199-1212, XP011574841.

Taghizadeh et al. "Hardware Impairments Aware Transceiver Design for Bidirectional Full-Duplex MIMO OFDM Systems", arxiv.org, Cornell University Library, 201 Olin Library Cornell University Ithaca, NY 14853,Apr. 16, 2017 (Apr. 16, 2017), XP081317500, 16 pages.

Farhadi et al. "Distributed Interference Alignment and Power Control for Wireless MIMO Interference Networks" 2013 IEEE Wireless Communication and Networking Conference (WCNC): PHY, pp. 3077-3082.

Moghadam et al. "Test-Bed Implementation of Iterative Interference Alignment and Power Control for Wireless MIMO Interference Networks" 2014 IEEE 5th International Workshop on Signal Processing Advances in Wireless Communications (SPAWC), pp. 239-243.

Jacobsson et al. "On Out-of-Band Emissions of Quantized Precoding in Massive MU-MIMO-OFDM" 51st Asilomar Conference on Signals, Systems, and Computers, 2017, pp. 21-26.

* cited by examiner

PRE-CODING SETTING

CROSS REFERENCE TO RELATED APPLICATION(S)

This application is a 35 U.S.C. § 371 National Phase Entry Application from PCT/EP2018/086398, filed Dec. 20, 2018, designating the United States, the disclosure of which is incorporated herein by reference in its entirety.

TECHNICAL FIELD

The present disclosure relates generally to the field of wireless communication. More particularly, it relates to pre-coding settings of transmitter and receiver nodes for wireless communication.

BACKGROUND

In advanced antenna systems, such as systems configured for massive multi-user multiple-input multiple-output (MU-MIMO) operation, spatial multiplexing is typically used to improve the overall throughput.

In such systems, simultaneous use of all time-frequency resources for several users may be enabled by proper beamforming at the transmitter node (transmitter node transmission pre-coding setting) and proper filtering at the receiver node (receiver node reception pre-coding setting). Furthermore, to achieve a target quality of service, it may be beneficial to properly control the transmission power allocated for the users; e.g., based on path loss and/or quality of the channel knowledge.

Iterative approaches for transceiver pre-coding setting and power control which aim to minimize the transmission power for each user to achieve reliable transmission at given rates are discussed in Hamed Farhadi, Chao Wang, Mikael Skoglund, "Distributed Transceiver Design and Power Control for Wireless MIMO Interference Networks," IEEE Transactions on Wireless Communications, vol 14, no 3, 2015; in Hamed Farhadi, Chao Wang, Mikael Skoglund, "Distributed interference alignment and power control for wireless MIMO interference networks," IEEE Wireless Communications and Networking Conference (WCNC), 2013; and in Nima Moghadam, Hamed Farhadi, Per Zetterberg, Mikael Skoglund, "Test-bed implementation of iterative interference alignment and power control for wireless MIMO interference networks," IEEE conference on Signal Processing Advances in Wireless Communications (SPAWC), 2014.

However, results provided by application of these approaches may be improved in various scenarios.

Therefore, there is a need for alternative approaches for transceiver pre-coding setting. Preferably, such approaches also provide power control.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a pre-coding method for a transmitter node configured for spatial multiplexing of signals into streams and for transmission of the spatially multiplexed streams, each stream intended for a receiver node.

The transmitter node and/or the receiver node comprises at least one hardware component causing signal distortion for one or more of a forward channel and a reverse channel.

The method comprises transmitting (for selection of a receiver node reception pre-coding setting) transmitter node reference signals for channel estimation, the transmitter node reference signals resulting from use of a transmitter node transmission pre-coding setting and an allocated transmission power.

The method also comprises receiving (from the receiver node) receiver node reference signals for channel estimation, the receiver node reference signals resulting from use of a selected receiver node reception pre-coding setting as receiver node transmission pre-coding setting.

The method further comprises estimating a reverse channel disturbance component (including the signal distortion for the reverse channel) of the received receiver node reference signals for channel estimation, selecting a transmitter node reception pre-coding setting based on the estimated reverse channel disturbance component, and updating the transmitter node transmission pre-coding setting by using the selected transmitter node reception pre-coding setting as transmitter node transmission pre-coding setting.

In some embodiments, estimating the reverse channel disturbance component of the received receiver node reference signals for channel estimation comprises estimating an interference covariance matrix based on the received receiver node reference signals for channel estimation and a model of the signal distortion for the reverse channel.

In some embodiments, selecting the transmitter node reception pre-coding setting comprises determining a signal-to-disturbance ratio for the reverse channel based on the estimated reverse channel disturbance component, an estimate of the reverse channel, and the receiver node transmission pre-coding setting, and selecting the transmitter node reception pre-coding setting based on the signal-to-disturbance ratio for the reverse channel.

In some embodiments, the method further comprises receiving a power allocation coefficient for an updated allocated transmission power after the transmission step, or receiving an estimated forward channel disturbance component of the transmitted transmitter node reference signals for channel estimation and determining an updated allocated transmission power based on the forward channel disturbance component.

A second aspect is a pre-coding method for a receiver node configured for reception of at least one spatial multiplexing stream from a transmitter node.

The transmitter node and/or the receiver node comprises at least one hardware component causing signal distortion for one or more of a forward channel and a reverse channel.

The method comprises receiving (from the transmitter node) transmitter node reference signals for channel estimation, the transmitter node reference signals resulting from use of a transmitter node transmission pre-coding setting and an allocated transmission power.

The method also comprises estimating a forward channel disturbance component (including the signal distortion for the forward channel) of the received transmitter node reference signals for channel estimation, selecting a receiver node reception pre-coding setting based on the estimated forward channel disturbance component, and updating a receiver node transmission pre-coding setting by using the selected receiver node reception pre-coding setting as receiver node transmission pre-coding setting.

Furthermore, the method comprises transmitting (for selection of a transmitter node reception pre-coding setting) receiver node reference signals for channel estimation, the receiver node reference signals resulting from use of the updated receiver node transmission pre-coding setting.

In some embodiments, estimating the forward channel disturbance component of the received transmitter node reference signals for channel estimation comprises estimating an interference covariance matrix based on the received transmitter node reference signals for channel estimation and a model of the signal distortion for the forward channel.

In some embodiments, selecting the receiver node reception pre-coding setting comprises determining a signal-to-disturbance ratio for the forward channel based on the estimated forward channel disturbance component, an estimate of the forward channel, and the transmitter node transmission pre-coding setting, and selecting the receiver node reception pre-coding setting based on the signal-to-disturbance ratio for the forward channel.

In some embodiments, the method further comprises determining an updated allocated transmission power based on the forward channel disturbance component and transmitting a power allocation coefficient for the updated allocated transmission power, or transmitting the estimated forward channel disturbance component of the transmitted transmitter node reference signals for channel estimation.

In some embodiments for any of the first and second aspects, determining the updated allocated transmission power comprises minimizing the allocated transmission power for each stream based on the forward channel disturbance component, the data rate of the stream, an estimate of the forward channel, the transmitter node transmission pre-coding setting, and the receiver node reception pre-coding setting.

In some embodiments for any of the first and second aspects, the method further comprises iterating the steps of the method.

For example, the steps of the method may be iterated until a stopping criterion is fulfilled. The stopping criterion may, for example, comprise one or more of: a maximum number of iterations have been performed, the transmitter node transmission pre-coding setting and/or the receiver node transmission pre-coding setting does not change when its updated, and a signaling performance metric satisfies a threshold criterion.

When steps of the method are to be iterated, initiation of one or more of the transmitter node transmission pre-coding setting and the receiver node transmission pre-coding setting may comprise using a default setting or a most recently used setting.

In some embodiments for any of the first and second aspects, the signal distortion comprises one or more of: non-linear distortion of a power amplifier, non-linear distortion of a signal clipper, oscillator phase noise, non-linear distortion of a filter, and quantization noise of a digital-to-analog converter.

A third aspect is a computer program product comprising a non-transitory computer readable medium, having thereon a computer program comprising program instructions. The computer program is loadable into a data processing unit and configured to cause execution of the method according to the first and/or second aspect when the computer program is run by the data processing unit.

A fourth aspect is a pre-coding apparatus for a transmitter node configured for spatial multiplexing of signals into streams, each stream intended for a receiver node.

The transmitter node and/or the receiver node comprises at least one hardware component causing signal distortion for one or more of a forward channel and a reverse channel.

The apparatus comprises controlling circuitry configured to cause transmission (for selection of a receiver node reception pre-coding setting) of transmitter node reference signals for channel estimation, the transmitter node reference signals resulting from use of a transmitter node transmission pre-coding setting and an allocated transmission power.

The controlling circuitry is also configured to cause reception (from the receiver node) of receiver node reference signals for channel estimation, the receiver node reference signals resulting from use of a selected receiver node reception pre-coding setting as receiver node transmission pre-coding setting.

The controlling circuitry is further configured to cause estimation of a reverse channel disturbance component (including the signal distortion for the reverse channel) of the received receiver node reference signals for channel estimation, selection of a transmitter node reception pre-coding setting based on the estimated reverse channel disturbance component, and update of the transmitter node transmission pre-coding setting by use of the selected transmitter node reception pre-coding setting as transmitter node transmission pre-coding setting.

A fifth aspect is a transmitter node, such as a base station or an access point, comprising the apparatus of the fourth aspect.

A sixth aspect is a pre-coding apparatus for a receiver node configured for reception of at least one spatial multiplexing stream from a transmitter node.

The transmitter node and/or the receiver node comprises at least one hardware component causing signal distortion for one or more of a forward channel and a reverse channel.

The apparatus comprises controlling circuitry configured to cause reception (from the transmitter node) of transmitter node reference signals for channel estimation, the transmitter node reference signals resulting from use of a transmitter node transmission pre-coding setting and an allocated transmission power.

The controlling circuitry is also configured to cause estimation of a forward channel disturbance component (including the signal distortion for the forward channel) of the received transmitter node reference signals for channel estimation, selection of a receiver node reception pre-coding setting based on the estimated forward channel disturbance component, and update of a receiver node transmission pre-coding setting by use of the selected receiver node reception pre-coding setting as receiver node transmission pre-coding setting.

The controlling circuitry is further configured to cause transmission (for selection of a transmitter node reception pre-coding setting) of receiver node reference signals for channel estimation, the receiver node reference signals resulting from use of the updated receiver node transmission pre-coding setting.

A seventh aspect is a receiver node, such as a user equipment, comprising the apparatus of the sixth aspect.

In some embodiments, any of the above aspects may additionally have features identical with or corresponding to any of the various features as explained above for any of the other aspects.

An advantage of some embodiments is that alternative approaches for transceiver pre-coding setting are provided.

Another advantage of some embodiments is that proper pre-coding settings are achieved when hardware components cause signal distortion.

Yet an advantage of some embodiments is that proper power control is provided when hardware components cause signal distortion.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, a challenge with advanced antenna systems is to properly select the beam-forming at the transmitter node (transmitter node transmission pre-coding setting) and the filtering at the receiver node (receiver node reception pre-coding setting), as well as to properly control the transmission power allocated for the users.

Previous approaches for transmitter/receiver pre-coding setting and power control typically use the effective signal-to-interference-plus-noise ratio (SINR) as metric and do not consider distortions caused by (e.g. radio frequency) hardware impairments. Example distortions caused by hardware impairments include non-linear effects of power amplifiers, oscillator phase noise, non-linear distortion of a signal clipper, non-linear distortion of a filter, and digital-to-analog converter (DAC) quantization noise.

Thus, the performance resulting from these previous approaches may be improved, e.g., when distortions caused by hardware impairments is prominent. The signal-to-interference-plus-noise-plus-distortion ratio (SINDR), based on a model of the hardware impairment, may be considered (instead of the SINR) for transmitter/receiver pre-coding setting and power control. The model of the hardware impairment may be any suitable model, e.g., a polynomial model (wherein, for example, one or more of the third, fifth, etc. order distortion component may be used as an approximation).

Figure 1:
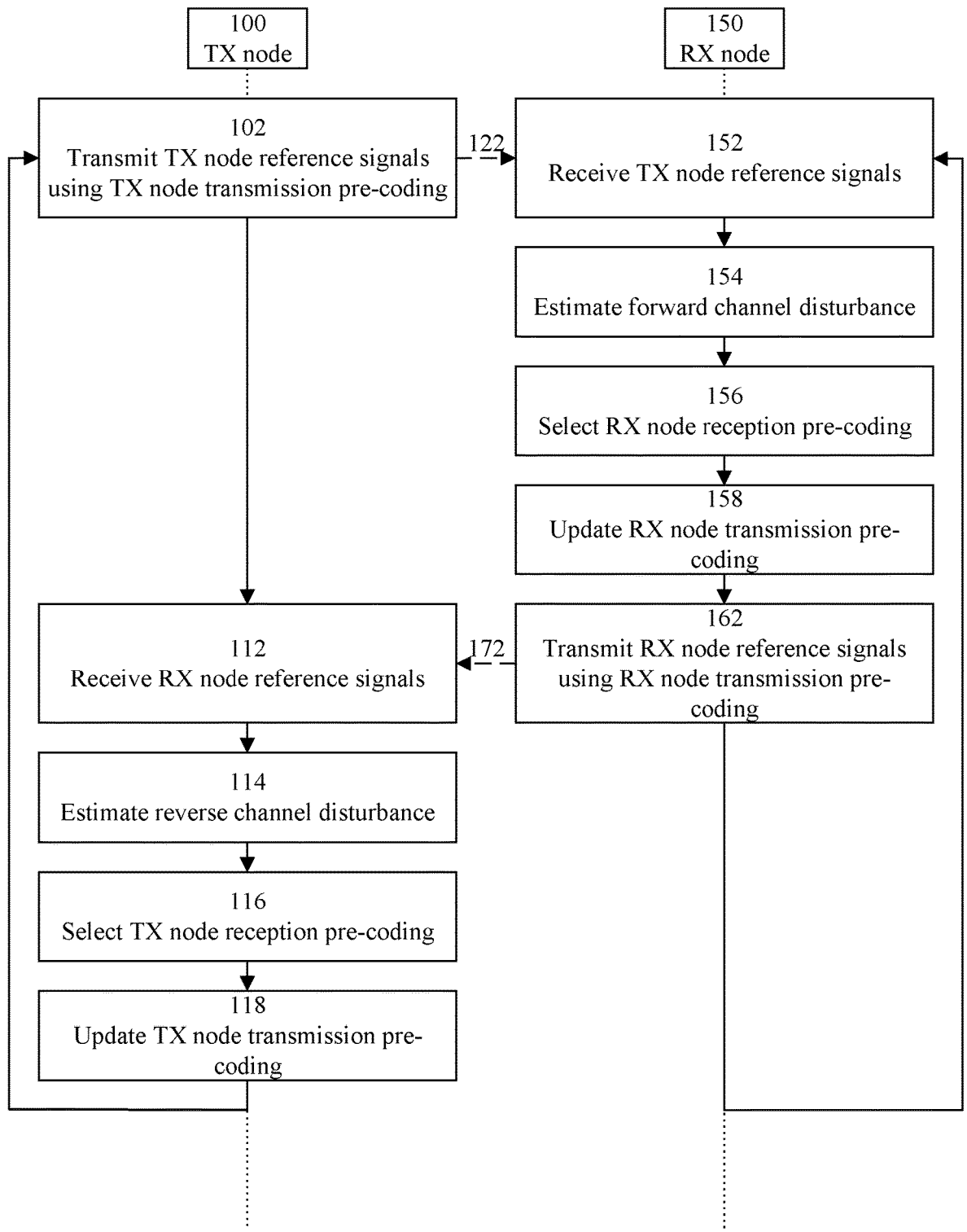
FIG. 1 is a combined flowchart and signaling diagram illustrating example method steps and signaling according to some embodiments.

FIG. 1 is a combined flowchart and signaling diagram illustrating example method steps and signaling of a transmitter (TX) node 100 and a receiver (RX) node 150. The transmitter node is configured for spatial multiplexing of signals into streams and for transmission of the spatially multiplexed streams, each stream intended for a receiver node. The receiver node is configured for reception of at least one spatial multiplexing stream from the transmitter node.

The transmitter node may, for example be a network node such as a base station or an access point, and the receiver node may, for example, be a wireless communication device such as a user equipment.

The transmitter node and/or the receiver node comprises at least one hardware component causing signal distortion for one or more of a forward channel (between the transmitter node and the receiver node) and a reverse channel (between the receiver node and the transmitter node).

At least some of the operations illustrated in FIG. 1 are for pre-coding, for example, for selecting beam-forming at the transmitter node (transmitter node transmission pre-coding setting) and for selecting filtering at the receiver node (receiver node reception pre-coding setting).

When the method is started (e.g., during a first iteration of the method), the transmitter node transmission pre-coding setting and/or the receiver node transmission pre-coding setting may be initiated, e.g., by using a most recently used transmitter/receiver node transmission pre-coding setting, or by using a default transmission pre-coding setting. An example of a default pre-coding setting is an omni-directional pre-coding setting. Furthermore, a transmit power allocation is typically also initialized, e.g., by using a most recently used transmit power allocation, or by using a default transmit power allocation. An example of a default transmit power allocation is a uniform transmit power allocation for all transmit streams.

In step 102, the transmitter node transmits transmitter node reference signals (e.g. pilot signals or similar) 122. The transmitter node reference signals are generated by using a transmitter node transmission pre-coding setting and an allocated transmission power.

The transmitter node transmission pre-coding setting may be a current transmitter node transmission pre-coding setting (e.g., an initial transmitter node transmission pre-coding setting in a first iteration of the method and an updated transmitter node transmission pre-coding setting in subsequent iterations of the method).

The allocated transmission power may be a current allocated transmission power (e.g., an initial allocated transmission power in a first iteration of the method and an updated allocated transmission power in subsequent iterations of the method). The allocated transmission power may be a per-stream allocated transmission power.

The reference signals 122 are for channel estimation of the forward channel and the transmission is for selection of a receiver node reception pre-coding setting. Generally, reception pre-coding setting may be seen as a detector setting (e.g. a receiver filter setting).

The transmitter node reference signals are received by the receiver node in step 152. In step 154, a forward channel disturbance component of the received transmitter node reference signals is estimated, wherein the forward channel disturbance component includes the signal distortion for the forward channel (caused by hardware impairments of the transmitter node and/or the receiver node). The signal distortion may, for example, comprise one or more of: non-linear distortion of a power amplifier, non-linear distortion of a signal clipper, oscillator phase noise, non-linear distortion of a filter, and quantization noise of a digital-to-analog converter.

For example, the disturbance component may include interference and distortion, or interference, noise and distortion.

Estimating the forward channel disturbance component of the received transmitter node reference signals for channel estimation may, for example, comprise estimating an interference covariance matrix based on the received transmitter node reference signals for channel estimation and a model of the signal distortion for the forward channel.

Then, a receiver node reception pre-coding setting is selected in step 156 based on the estimated forward channel disturbance component. Thereby the receiver node reception pre-coding setting (the detection at the receiver node) takes the distortion caused by hardware impairments into account.

Selecting the receiver node reception pre-coding setting may, for example comprise determining a minimum mean square error (MMSE) receiver filter, a matched filter, a maximum likelihood (ML) detector, a zero-forcing (ZF) detector, or similar.

Selecting the receiver node reception pre-coding setting may, for example, comprise determining a signal-to-disturbance ratio (e.g., a signal-to-interference-plus-noise-plus-distortion ratio) for the forward channel based on the estimated forward channel disturbance component, an estimate of the forward channel, and the transmitter node transmission pre-coding setting, and selecting the receiver node reception pre-coding setting based on the signal-to-disturbance ratio for the forward channel.

In step 158, the receiver node transmission pre-coding setting is updated by using the selected receiver node reception pre-coding setting as receiver node transmission pre-coding setting. This is particularly suitable when there is reciprocity between the forward channel and the reverse channel, but may provide adequate results also when there is not reciprocity between the forward channel and the reverse channel. Thereby the receiver node transmission pre-coding setting (the beam-forming at the receiver node) takes the distortion caused by hardware impairments into account.

In step 162, the receiver node transmits receiver node reference signals (e.g. pilot signals or similar) 172. The receiver node reference signals are generated by using a receiver node transmission pre-coding setting.

The receiver node transmission pre-coding setting may be a current receiver node transmission pre-coding setting (e.g., an initial receiver node transmission pre-coding setting in a first iteration of the method if there is no updated receiver node transmission pre-coding setting—and an updated transmitter node transmission pre-coding setting—when available).

The reference signals 172 are for channel estimation of the reverse channel and the transmission is for selection of a transmitter node reception pre-coding setting.

The receiver node reference signals are received by the transmitter node in step 112. In step 114, a reverse channel disturbance component of the received receiver node reference signals is estimated, wherein the reverse channel disturbance component includes the signal distortion for the reverse channel (caused by hardware impairments of the transmitter node and/or the receiver node).

For example, the disturbance component may include interference and distortion, or interference, noise and distortion.

Estimating the reverse channel disturbance component of the received receiver node reference signals for channel estimation may, for example, comprise estimating an interference covariance matrix based on the received receiver node reference signals for channel estimation and a model of the signal distortion for the reverse channel.

Then, a transmitter node reception pre-coding setting is selected in step 116 based on the estimated reverse channel disturbance component. Thereby the transmitter node reception pre-coding setting (the detection at the transmitter node) takes the distortion caused by hardware impairments into account.

Selecting the receiver node reception pre-coding setting may, for example comprise determining a minimum mean square error (MMSE) receiver filter, a matched filter, a maximum likelihood (ML) detector, a zero-forcing (ZF) detector, or similar.

Selecting the transmitter node reception pre-coding setting may, for example, comprise determining a signal-to-disturbance ratio (e.g., a signal-to-interference-plus-noise-plus-distortion ratio) for the reverse channel based on the estimated reverse channel disturbance component, an estimate of the reverse channel, and the receiver node transmission pre-coding setting, and selecting the transmitter node reception pre-coding setting based on the signal-to-disturbance ratio for the reverse channel.

In step 118, the transmitter node transmission pre-coding setting is updated by using the selected transmitter node reception pre-coding setting as transmitter node transmission pre-coding setting. This is particularly suitable when there is reciprocity between the forward channel and the reverse channel, but may provide adequate results also when there is not reciprocity between the forward channel and the reverse channel. Thereby the transmitter node transmission pre-coding setting (the beam-forming at the transmitter node) takes the distortion caused by hardware impairments into account.

In addition to the steps illustrated in FIG. 1, the receiver node may also determine (e.g., in connection with any of steps 156, 158, 162) an updated allocated transmission power based on the forward channel disturbance component, and transmit (e.g., in connection with step 162) a power allocation coefficient for the updated allocated transmission power. The power allocation coefficient for the updated allocated transmission power is then received by the transmitter node and may be used in step 102 of subsequent iterations of the method.

Alternatively or additionally, and in addition to the steps illustrated in FIG. 1, the receiver node may also transmit (e.g., in connection with any of steps 154, 156, 158, 162) the estimated forward channel disturbance component. The estimated forward channel disturbance component is then received by the transmitter node and may be used to determine an updated allocated transmission power, which may in turn be used in step 102 of subsequent iterations of the method.

In any case, the allocated transmission power may be a per-stream allocated transmission power.

Determining the updated allocated transmission power may comprise minimizing the allocated transmission power for each stream based on the forward channel disturbance component, the data rate of the stream, an estimate of the forward channel, the transmitter node transmission pre-coding setting, and the receiver node reception pre-coding setting.

Generally, transmitter beamforming matrices (steps 118 and 158) and receiver filtering matrices (steps 116 and 156) may be designed to maximize the signal-to-interference-plus-noise-plus-distortion ratio (SINDR) for each stream.

Alternatively or additionally, transmitter beamforming matrices (steps 118 and 158), receiver filtering matrices (steps 116 and 156) and allocated transmission power may be designed for assigning minimum possible power to each encoded data stream such that successful communication can be guaranteed.

As indicated by the loop-back arrows of FIG. 1, the method may be iterated, for example, until a stopping criterion is fulfilled. Example stopping criteria include that a maximum number of iterations have been performed, that the transmitter node transmission pre-coding setting and/or the receiver node transmission pre-coding setting does not change when its updated, and that a signaling performance metric satisfies a threshold criterion.

Once determined the transmitter/receiver node transmission/reception pre-coding settings and the allocated transmission power are used for communication between the transmitter node and the receiver node.

Figure 2:
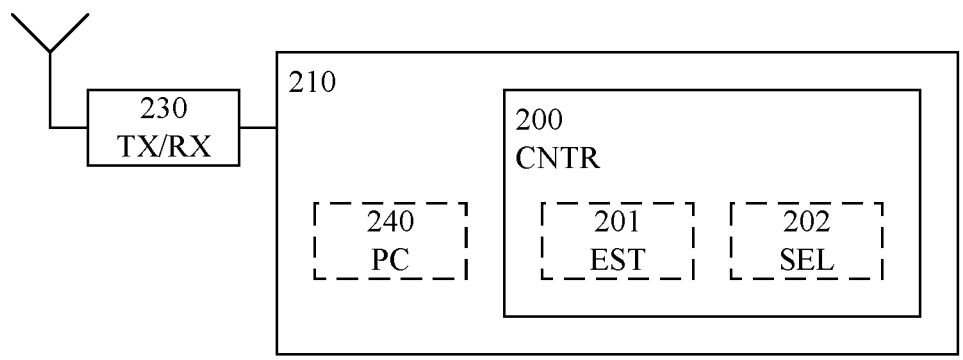
FIG. 2 is a schematic block diagram illustrating an example apparatus according to some embodiments.

FIG. 2 schematically illustrates an example pre-coding apparatus 210 (e.g., a pre-coder) for a transmitter node (compare with the transmitter node 100 of FIG. 1), e.g., a network node such as a base station or an access point. The apparatus comprises controlling circuitry (CNTR; e.g. a controller or a controlling entity) 200 and a pre-coder (PC; e.g., pre-coding circuitry) 240 for storing current transmitter node transmission/reception pre-coding settings.

The controlling circuitry is configured to cause transmission of transmitter node reference signals for channel estimation and for selection of a receiver node reception pre-coding setting (compare with step 102 of FIG. 1). The transmitter node reference signals result from use of a transmitter node transmission pre-coding setting and an allocated transmission power.

The controlling circuitry is also configured to cause reception of receiver node reference signals for channel estimation (compare with step 112 of FIG. 1). The receiver node reference signals result from use of a selected receiver node reception pre-coding setting as receiver node transmission pre-coding setting.

To this end, the controlling circuitry may be associated with (e.g., connected, or connectable to) a transceiver (TX/RX; e.g., transceiving circuitry) 230. The transceiver may be configured to transmit the transmitter node reference signals and/or receive the receiver node reference signals.

The controlling circuitry is further configured to cause estimation of a reverse channel disturbance component (including the signal distortion for the reverse channel) of the received receiver node reference signals (compare with step 114 of FIG. 1). To this end, the controlling circuitry may comprise or be otherwise associated with (e.g., connected, or connectable to) an estimator (EST; e.g., estimation circuitry) 201. The estimator may be configured to estimate the reverse channel disturbance component.

The controlling circuitry is further configured to cause selection of a transmitter node reception pre-coding setting based on the estimated reverse channel disturbance component (compare with step 116 of FIG. 1). To this end, the controlling circuitry may comprise or be otherwise associated with (e.g., connected, or connectable to) a selector (SEL; e.g., selection circuitry) 202. The selector may be configured to select the transmitter node reception pre-coding setting.

The controlling circuitry is further configured to cause update of the transmitter node transmission pre-coding setting 240 by use of the selected transmitter node reception pre-coding setting as transmitter node transmission pre-coding setting (compare with step 118 of FIG. 1).

Figure 3:
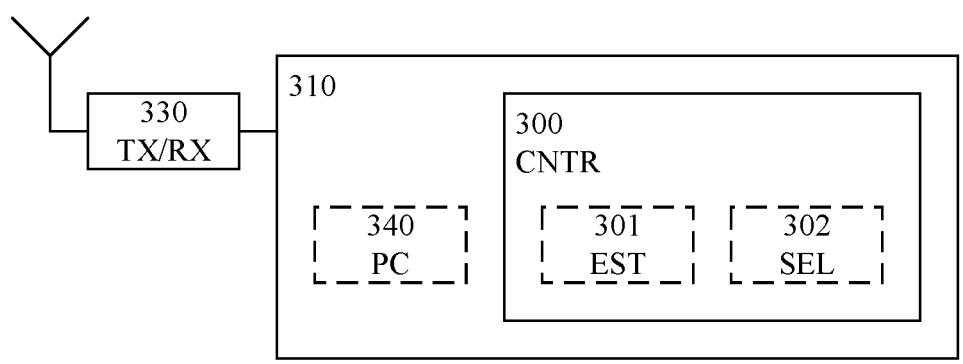
FIG. 3 is a schematic block diagram illustrating an example apparatus according to some embodiments.

FIG. 3 schematically illustrates an example pre-coding apparatus 310 (e.g., a pre-coder) for a receiver node (compare with the receiver node 150 of FIG. 1), e.g., a wireless communication device such as a user equipment. The apparatus comprises controlling circuitry (CNTR; e.g. a controller or a controlling entity) 300 and a pre-coder (PC; e.g., pre-coding circuitry) 340 for storing current receiver node transmission/reception pre-coding settings.

The controlling circuitry is configured to cause reception of transmitter node reference signals for channel estimation (compare with step 152 of FIG. 1). The transmitter node reference signals result from use of a transmitter node transmission pre-coding setting and an allocated transmission power. To this end, the controlling circuitry may be associated with (e.g., connected, or connectable to) a transceiver (TX/RX; e.g., transceiving circuitry) 330. The transceiver may be configured to receive the transmitter node reference signals.

The controlling circuitry is further configured to cause estimation of a forward channel disturbance component (including the signal distortion for the reverse channel) of the received transmitter node reference signals (compare with step 154 of FIG. 1). To this end, the controlling circuitry may comprise or be otherwise associated with (e.g., connected, or connectable to) an estimator (EST; e.g., estimation circuitry) 301. The estimator may be configured to estimate the forward channel disturbance component.

The controlling circuitry is further configured to cause selection of a receiver node reception pre-coding setting based on the estimated forward channel disturbance component (compare with step 156 of FIG. 1). To this end, the controlling circuitry may comprise or be otherwise associated with (e.g., connected, or connectable to) a selector (SEL; e.g., selection circuitry) 302. The selector may be configured to select the receiver node reception pre-coding setting.

The controlling circuitry is further configured to cause update of the receiver node transmission pre-coding setting 340 by use of the selected receiver node reception pre-coding setting as receiver node transmission pre-coding setting (compare with step 158 of FIG. 1).

The controlling circuitry is also configured to cause transmission of receiver node reference signals for channel estimation and for selection of a transmitter node reception pre-coding setting (compare with step 162 of FIG. 1). The receiver node reference signals result from use of the updated receiver node transmission pre-coding setting. The transceiver 330 may be configured to transmit the receiver node reference signals.

Thus, according to some embodiments alternative approaches are provided wherein proper transceiver pre-coding settings (and possibly proper power control) are achieved when hardware components cause signal distortion.

Possible advantages of various embodiments include reduced transmit power (and thereby improved energy efficiency), and possibility to handle various and/or a plurality of hardware distortion sources.

Furthermore, low cost radio design is enabled since requirements on hardware components can be relaxed and/or since mitigation by pre-distortion may be omitted.

A detailed example implementation of some embodiments will now be provided with reference to FIG. 1. In this example, a transmitter node (e.g., a base station or an access point) indexed j transmits $D_j$ independent streams where the $d^{th}$ stream is beam-formed with the vector $v_j^d$ (transmitter node transmission pre-coding setting) and transmitting data at the rate $R_j^d$ and the power $p_j^d$, and a receiver node (e.g., a user equipment) indexed k has a receiver filter vector $u_k^d$ (receiver node reception pre-coding setting) for the $d^{th}$ stream.

During a downlink training phase (compare with steps 102, 152, 154), a total interference covariance matrix $Q_k^l$ (forward channel disturbance component) corresponding to a (desired) stream l (transmitted by transmitter node k) as seen at receiver node k is estimated based on training (reference) signals at each receiver node as:

$$Q_k^l = \sum_{j=1}^{K}\sum_{d=1}^{D_j} p_j^d H_{kj} v_j^d (v_j^d)^* (H_{kj})^* - p_k^l H_{kk} v_k^l (v_k^l)^* (H_{kk})^* +$$

$$\sum_{j=1}^{K}\sum_{d=1}^{D_j} p_j^d H_{kj} Q_{ee,j}^{d,in} (H_{kj})^* + \sum_{j \in S_{DL}^{out}}\sum_{d=1}^{D_j} p_j^d H_{kj} Q_{ee,j}^{d,out} (H_{kj})^*,$$

where $H_{kj}$ is the forward channel matrix between transmitter node j and receiver node k, $Q_{ee,j}^{d,in}$ is the downlink in-band hardware impairment covariance matrix corresponding to the $d^{th}$ stream of transmitter node j, $S_{DL}^{out}$ is the set of indices of transmitter nodes that contribute out-of-band emission due to hardware impairments, and $Q_{ee,j}^{d,out}$ is the downlink out-of-band hardware impairment covariance matrix corresponding to the $d_{th}$ stream of transmitter node j. Thus, the two last terms in the above formula exemplify the signal distortion for the forward channel caused by hardware impairments.

In a receiver filter optimization phase (compare with step 156), minimum mean square error (MMSE) receiver filters (receiver node reception pre-coding setting) are updated as:

$$u_k^l = \frac{(Q_k^l)^{-1} H_{kk} v_k^l}{\|(Q_k^l)^{-1} H_{kk} v_k^l\|_2}.$$

In a power updating phase (not shown in FIG. 1), the transmit power (allocated transmission power) for the $l^{th}$ stream is updated as:

$$p_k^l = \min\left\{ \frac{(2^{R_k^l}-1)((u_k^l)^* Q_k^l u_k^l)}{|(u_k^l)^* H_{kk} v_k^l|^2}, p_{max} \right\},$$

where $p_{max}$ is the maximum allowed transmit power and $R_k^l$ is the transmission data rate of steam l. As mentioned before, this step may be performed at the receiver node or at the transmitter node.

During an uplink training phase (compare with steps 162, 112, 114), a total interference covariance matrix $Q_k^{r,l}$ (reverse channel disturbance component) corresponding to a (desired) stream l (transmitted by receiver node k) as seen at transmitter node k, where r denotes the reverse channel, is estimated based on training (reference) signals at each transmitter node as:

$$Q_k^{r,l} = \sum_{j=1}^{K}\sum_{d=1}^{D_j} p_u H_{kj}^r v_j^{r,d} (v_j^{r,d})^* (H_{kj}^r)^* - p_u H_{kk}^r v_k^{r,l} (v_k^{r,l})^* (H_{kk}^r)^* +$$

$$\sum_{j=1}^{K}\sum_{d=1}^{D_j} p_u H_{kj}^r Q_{ee,j}^{r,d,in} (H_{kj}^r)^* + \sum_{j \in S_{UL}^{out}}\sum_{d=1}^{D_j} p_u H_{kj}^r Q_{ee,j}^{r,d,out} (H_{kj}^r)^*,$$

where $H_{kj}^r$ is the reverse channel matrix between receiver node j and transmitter node k, $p_u$ is the transmit power for the uplink, $Q_{ee,j}^{r,d,in}$ is the uplink in-band hardware impairment covariance matrix corresponding to the $d^{th}$ stream of transmitter node j, $S_{UL}^{out}$ is the set of indices of receiver nodes that contribute out-of-band emission due to hardware impairments, and $Q_{ee,j}^{r,d,out}$ is the uplink out-of-band hardware impairment covariance matrix corresponding to the $d^{th}$ stream of transmitter node j. Thus, the two last terms in the above formula exemplify the signal distortion for the reverse channel caused by hardware impairments.

In the uplink training phase the receiver node reception pre-coding settings $u_j^d$ determined in the downlink training phase are used as receiver node transmission pre-coding settings $v_j^{r,d}$ (compare with step 158).

In a transmitter beam-forming optimization phase (compare with steps 116 and 118), minimum mean square error (MMSE) receiver filters (transmitter node reception pre-coding setting) are first updated as:

$$u_k^{r,l} = \frac{(Q_k^{r,l})^{-1} H_{kk}^r v_k^{r,l}}{\|(Q_k^{r,l})^{-1} H_{kk}^r v_k^{r,l}\|_2}.$$

Then, the transmitter node reception pre-coding settings $u_j^{r,d}$ are used as transmitter node transmission pre-coding settings $v_j^d$.

Using the determined reception pre-coding setting as transmission pre-coding setting will be particularly suitable for scenarios with uplink/downlink channel reciprocity. Then, it may be expected that the receive filters for uplink transmission that minimize received interference also has the lowest interference contribution in downlink transmission due to the reciprocity principle. However, reciprocity is not a necessary condition for the principles to be beneficial.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node (e.g., a base station or an access point).

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 4:
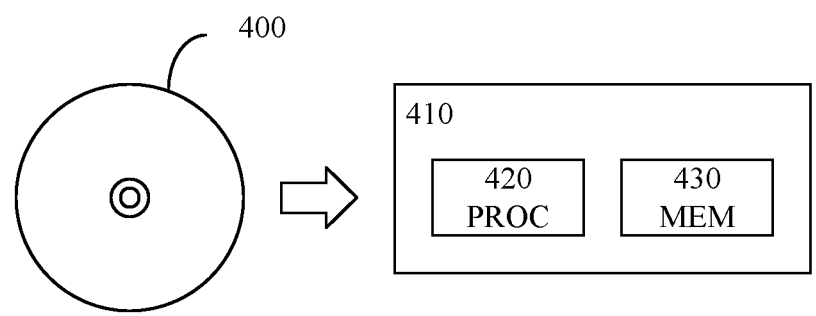
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC; e.g., data processing circuitry or a data processing unit)) 420, which may, for example, be comprised in a wireless communication device or a network node (e.g., a base station or an access point) 410. When loaded into the data processor, the computer program may be stored in a memory (MEM) 430 associated with or comprised in the data-processing unit. According to some embodiments, the computer program may, when loaded into and run by the data processing unit, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A pre-coding method for a transmitter node configured for spatial multiplexing of signals into streams and for transmission of the spatially multiplexed streams, each stream intended for a receiver node, the transmitter node and/or the receiver node comprising at least one hardware component causing signal distortion for one or more of a forward channel and a reverse channel, the method comprising:
    transmitting, for selection of a receiver node reception pre-coding setting, transmitter node reference signals for channel estimation, the transmitter node reference signals resulting from use of a transmitter node transmission pre-coding setting and an allocated transmission power;
    receiving, from the receiver node, receiver node reference signals for channel estimation, the receiver node reference signals resulting from use of a selected receiver node reception pre-coding setting as receiver node transmission pre-coding setting;
    estimating a reverse channel disturbance component of the received receiver node reference signals for channel estimation, the reverse channel disturbance component including the signal distortion for the reverse channel, which was caused by said at least one hardware component;
    selecting a transmitter node reception pre-coding setting based on the estimated reverse channel disturbance component; and
    updating the transmitter node transmission pre-coding setting by using the selected transmitter node reception pre-coding setting as transmitter node transmission pre-coding setting.

2. The method of claim 1, wherein estimating the reverse channel disturbance component of the received receiver node reference signals for channel estimation comprises estimating an interference covariance matrix based on the received receiver node reference signals for channel estimation and a model of the signal distortion for the reverse channel, which was caused by said at least one hardware component.

3. The method of claim 2, wherein the interference covariance matrix is estimated based at least on a reverse channel matrix and an uplink hardware impairment covariance matrix.

4. The method of claim 1, wherein selecting the transmitter node reception pre-coding setting comprises:
    determining a signal-to-disturbance ratio for the reverse channel based on the estimated reverse channel disturbance component, an estimate of the reverse channel, and the receiver node transmission pre-coding setting; and
    selecting the transmitter node reception pre-coding setting based on the signal-to-disturbance ratio for the reverse channel.

5. The method of claim 1, further comprising:
    receiving a power allocation coefficient for an updated allocated transmission power after the transmission step; or
    receiving an estimated forward channel disturbance component of the transmitted transmitter node reference signals for channel estimation and determining an updated allocated transmission power based on the forward channel disturbance component.

6. The method of claim 5, wherein determining the updated allocated transmission power comprises minimizing the allocated transmission power for each stream based on the forward channel disturbance component, the data rate of the stream, an estimate of the forward channel, the transmitter node transmission pre-coding setting, and the receiver node reception pre-coding setting.

7. The method of claim 1, further comprising iterating the steps of the method.

8. The method of claim 7, wherein the steps of the method are iterated until a stopping criterion is fulfilled, the stopping criterion comprising one or more of:
 a maximum number of iterations have been performed;
 the transmitter node transmission pre-coding setting and/or the receiver node transmission pre-coding setting does not change when updated; and
 a signaling performance metric satisfies a threshold criterion.

9. The method of claim 7, wherein initiation of one or more of the transmitter node transmission pre-coding setting and the receiver node transmission pre-coding setting comprises a default setting or a most recently used setting.

10. The method of claim 1, wherein the signal distortion comprises one or more of: non-linear distortion of a power amplifier, non-linear distortion of a signal clipper, oscillator phase noise, non-linear distortion of a filter, and quantization noise of a digital-to-analog converter.

11. A pre-coding method for a receiver node configured for reception of at least one spatial multiplexing stream from a transmitter node, the transmitter node and/or the receiver node comprising at least one hardware component causing signal distortion for one or more of a forward channel and a reverse channel, the method comprising:
 receiving, from the transmitter node, transmitter node reference signals for channel estimation, the transmitter node reference signals resulting from use of a transmitter node transmission pre-coding setting and an allocated transmission power;
 estimating a forward channel disturbance component of the received transmitter node reference signals for channel estimation, the forward channel disturbance component including the signal distortion for the forward channel, which was caused by said at least one hardware component;
 selecting a receiver node reception pre-coding setting based on the estimated forward channel disturbance component;
 updating a receiver node transmission pre-coding setting by using the selected receiver node reception pre-coding setting as receiver node transmission pre-coding setting; and
 transmitting, for selection of a transmitter node reception pre-coding setting, receiver node reference signals for channel estimation, the receiver node reference signals resulting from use of the updated receiver node transmission pre-coding setting.

12. The method of claim 11, wherein estimating the forward channel disturbance component of the received transmitter node reference signals for channel estimation comprises estimating an interference covariance matrix based on the received transmitter node reference signals for channel estimation and a model of the signal distortion for the forward channel, which was caused by said at least one hardware component.

13. The method of claim 12, wherein the interference covariance matrix is estimated based at least on a forward channel matrix and a downlink hardware impairment covariance matrix.

14. The method of claim 11, wherein selecting the receiver node reception pre-coding setting comprises:
 determining a signal-to-disturbance ratio for the forward channel based on the estimated forward channel disturbance component, an estimate of the forward channel, and the transmitter node transmission pre-coding setting; and
 selecting the receiver node reception pre-coding setting based on the signal-to-disturbance ratio for the forward channel.

15. The method of claim 11, further comprising:
 determining an updated allocated transmission power based on the forward channel disturbance component and transmitting a power allocation coefficient for the updated allocated transmission power; or
 transmitting the estimated forward channel disturbance component of the transmitted transmitter node reference signals for channel estimation.

16. A computer program product comprising a non-transitory computer readable medium, having thereon a computer program comprising program instructions, the computer program being loadable into a data processing unit and configured to cause execution of the method according to claim 1, when the computer program is run by the data processing unit.

17. A pre-coding apparatus for a transmitter node configured for spatial multiplexing of signals into streams, each stream intended for a receiver node, the transmitter node and/or the receiver node comprising at least one hardware component causing signal distortion for one or more of a forward channel and a reverse channel, the apparatus comprising controlling circuitry configured to cause:
 transmission, for selection of a receiver node reception pre-coding setting, of transmitter node reference signals for channel estimation, the transmitter node reference signals resulting from use of a transmitter node transmission pre-coding setting and an allocated transmission power;
 reception, from the receiver node, of receiver node reference signals for channel estimation, the receiver node reference signals resulting from use of a selected receiver node reception pre-coding setting as receiver node transmission pre-coding setting;
 estimation of a reverse channel disturbance component of the received receiver node reference signals for channel estimation, the reverse channel disturbance component including the signal distortion for the reverse channel, which was caused by said at least one hardware component;
 selection of a transmitter node reception pre-coding setting based on the estimated reverse channel disturbance component; and
 update of the transmitter node transmission pre-coding setting by use of the selected transmitter node reception pre-coding setting as transmitter node transmission pre-coding setting.

18. A transmitter node comprising the apparatus of claim 17.

19. A pre-coding apparatus for a receiver node configured for reception of at least one spatial multiplexing stream from a transmitter node, the transmitter node and/or the receiver node comprising at least one hardware component causing signal distortion for one or more of a forward channel and a reverse channel, the apparatus comprising controlling circuitry configured to cause:

reception, from the transmitter node, of transmitter node reference signals for channel estimation, the transmitter node reference signals resulting from use of a transmitter node transmission pre-coding setting and an allocated transmission power;

estimation of a forward channel disturbance component of the received transmitter node reference signals for channel estimation, the forward channel disturbance component including the signal distortion for the forward channel, which was caused by said at least one hardware component;

selection of a receiver node reception pre-coding setting based on the estimated forward channel disturbance component;

update of a receiver node transmission pre-coding setting by use of the selected receiver node reception pre-coding setting as receiver node transmission pre-coding setting; and transmission, for selection of a transmitter node reception pre-coding setting, of receiver node reference signals for channel estimation, the receiver node reference signals resulting from use of the updated receiver node transmission pre-coding setting.

20. A receiver node comprising the apparatus of claim 19.

* * * * *